United States Patent Office 2,972,830
Patented Feb. 28, 1961

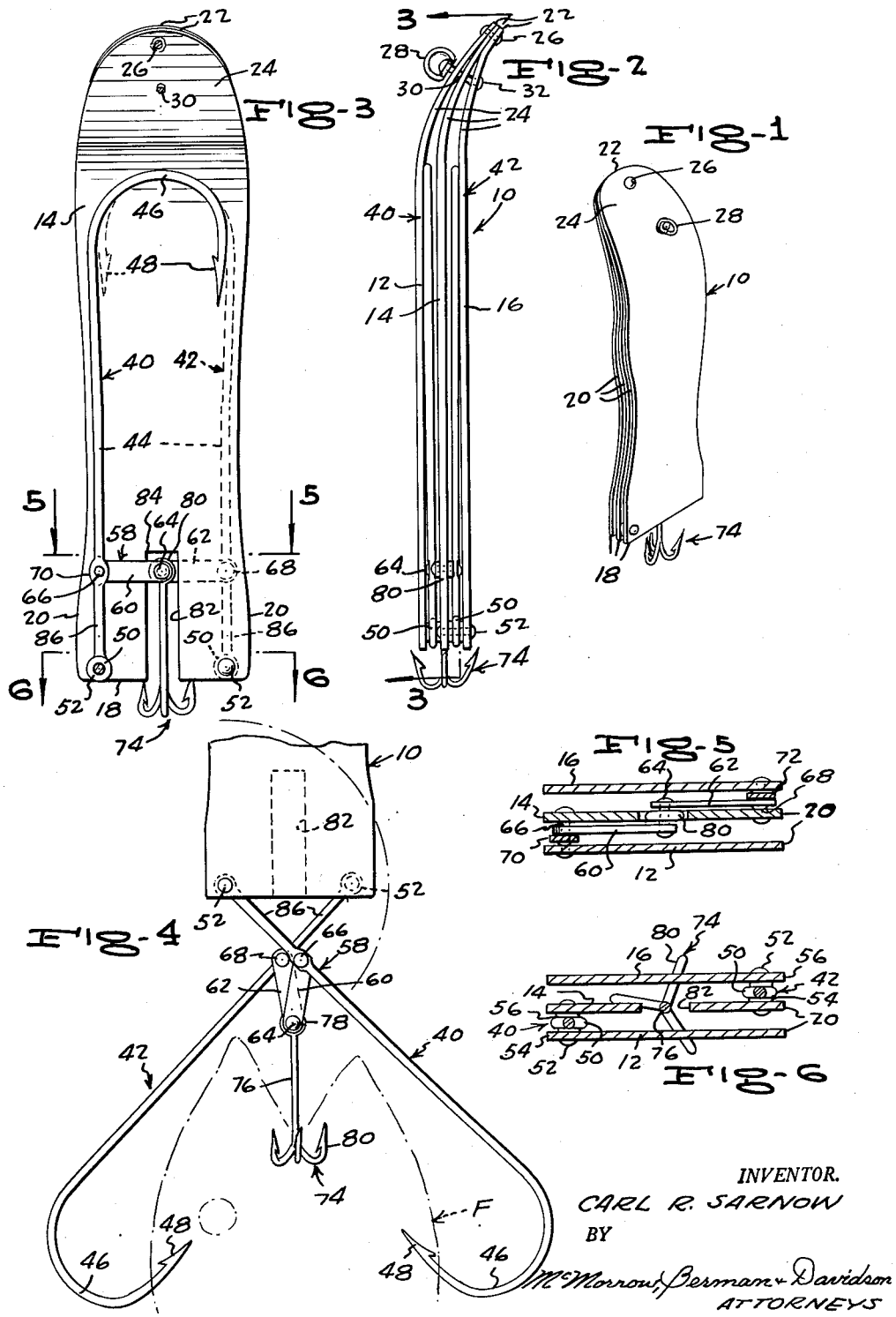

2,972,830

SPOON HAVING CONCEALED GRIPPING HOOKS

Carl R. Sarnow, 5212 Kent Drive, Bakersfield, Calif.

Filed Apr. 28, 1959, Ser. No. 809,461

8 Claims. (Cl. 43—35)

This invention relates to a fishing spoon having gripping hooks which are normally enclosed in its body and are operated only by the pull of a fish on a trailing hook to grip opposite sides of the fish.

The primary object of the invention is to provide a device of the character indicated which has a spoon body producing darting motions in water, in which a pair of pivoted fish-gripping hooks are normally enclosed and concealed, so as to eliminate unwanted commotion and drag in water which unenclosed gripping hooks produce, when trolling, and snagging of these hooks, and unwanted exposure of the gripping hooks, when casting.

Another object of the invention is to provide an efficient, rugged, compact, and mechanically superior device of the character indicated above, having novel link and lever mechanism operatively connecting a trailing hook assembly to the fish-gripping hooks, whereby the gripping hooks are smoothly, gradually, and positively operated to fish-gripping position from enclosed inoperative position.

Other important objects and advantageous features of the invention will be apparent from the following description and the accompanying drawings, wherein, for purposes of illustration only, a specific form of the invention is set forth in detail.

In the drawings:

Figure 1 is a top perspective view of a device of the invention, with the fish-gripping hooks enclosed in inoperative positions;

Figure 2 is an enlarged side elevation of Figure 1;

Figure 3 is a longitudinal section taken on the line 3—3 of Figure 2;

Figure 4 is an enlarged fragmentary top plan view of the device, showing the gripping hooks operated to grip opposite sides of a fish taking the trailing hook assembly; and Figures 5 and 6 are transverse sections taken on the lines 5—5 and 6—6, respectively, of Figure 3.

Referring in detail to the drawings, wherein like numerals designate like parts throughout the several views, the illustrated device comprises a longitudinally elongated spoon body 10 which is composed of a top plate 12, an intermediate plate 14, and a bottom plate 16. These plates are made of suitable flat rigid plate material, either metal or other, and are substantially similar in shape and area, having in common, squared rear or trailing end edges 18, concavely curved longitudinal side edges 20, and rounded or convexly arcuate leading or forward end edges 22.

The plates 12, 14 and 16, as seen in Figure 2, also have in common forwardly and downwardly deflected, and preferably curved forward end or head portions 24, and the plates are fixed together, in overlying and coextensive relation, at their forward ends only, by suitable means, such as a rivet 26, extending therethrough at their forward ends 22, at a point on the longitudinal centerline of the plates. A fishing line attaching swivel eye 28 is secured to the body 10 at the convex upper side of the head portion 24 of the top plate 12 by means of a pin 30 which extends through the head portions of the three plates and has an enlarged head 32 to bear against the underside of the head portion 24 of the bottom plate 16, in opposition to the eye 28. The point at which the pin 30 transverse the plates is on the longitudinal centerline of the body 10 and rearwardly of and eccentric with respect to the rivet 26, so that any tendency of the plates to rotate relative to each other on the rivet is positively precluded.

The device further comprises a pair of similar but reversed fish-gripping hooks 40, 42 each of which has a straight shank 44 of a length less than that of the body 10, having on one end a laterally inwardly directed arcuate bend 46 which terminates in a forwardly extending barb 48, and on its other end an eye 50 which lies in the plane of the snell 46. As shown in Figure 3 and 6, the hooks 40 and 42 are severally located between the intermediate plate 14 and the top and bottom plates 12 and 16. In the arrangement shown the hook 40 is located between the intermediate plate 14 and the top plate 12, and is referred to here as being the upper hook, and the hook 42, called the lower hook, is located between the intermediate plate 14 and the bottom plate 16. However, it will be understood that this arrangement of the hooks can be reversed within the concept of the invention.

The hooks 40 and 42 have their eyes 50 pivotally and securably engaged on pivot means, such as headed rivets 52 which extend through the intermediate plate 14 and the related other plates, at locations at and within the rear corners of the plates which are defined by the meetings of the rear end edges 18 and the side edges 20, and spacing and anti-friction bearing washers 54, 56 are circumposed on the rivets 52 at opposite sides of the eyes 50.

The device further comprises an over-center link and lever operating assembly, generally designated 58, which comprises a pair of similar elongated flat upper and lower links 60, 62, whose combined assembled lengths substantially equal the distance between the shanks 44 of the hooks 40, 42 when the hooks are enclosed and concealed in the body 10, as shown in Figure 3, with the shanks 44 parallel to each other. The links 60, 62 overlap at their laterally inward ends and are both thereat traversed by a pivot, such as a headed pin 64, the link 60 being located between the intermediate body plate 14 and the top plate 12 and the link 62 between the plate 14 and the bottom body plate 16. At their laterally outward ends the links 60, 62 are pivoted and secured on pivots, such as headed pins 66, 68, respectively, which extend through flats 70, 72 formed on the shanks of the hooks 40, 42, respectively, at points near to and spaced from the hook eyes 50. As seen in Figure 5, the links are preferably located at the sides of the flats 70, 72 adjacent to the intermediate body plate 14.

The device further comprises a trailing hook assembly 74 which comprises a longitudinally elongated shank 76 having an eye 78 on its forward end, and a multiple hook 80 on its rear end. The eye 78 is pivotally circumposed on the link connecting pin 64, between the links 60, 62, and the length of the shank 76 is such that the multiple hook 80 trails behind the rear end of the body 10 when, as shown in Figure 3, the fish gripping hooks 40, 42 are enclosed and concealed within the body 10. It will be noted that in the enclosed and inoperative positions of the hooks 40, 42, their bends 46 overlap. The link connecting pin 64 and the eye and shank of the trailing hook assembly 74 work freely but in a guided manner in a central longitudinal slot 82 which is provided in the intermediate body plate 14 and opens to its rear end edge 18. The slot 82 has a closed forward end 84 which is located forwardly of the forwardmost point to which the link connecting pin 64 is intended to reach.

The link and lever assembly 58 includes the links 60, 62 and their pivotal connections, and the portions 86 of the fish-gripping hook shanks 44 which extend between the pivot pins 66, 68 and flats 70, 72, and the eyes 50 and the pivot pins 52, the said portions 86 being levers for swinging the hooks 40, 42 to their operative positions. As seen in Figures 3 and 4, a rearward pull on the trailing hook assembly 74, by a fish F, pulls the same rearwardly relative to the rear end of the body 10, which is tethered to a fishing line (not shown) by means of the swivel eye 28. This produces rearward and laterally inward swinging of the links 60, 62 toward each other, and causes the gripping hooks 40, 42 to swing laterally outwardly from the body 10 and rearwardly and then laterally inwardly, so that the barbs engage and grip opposite sides of the fish F. In this swinging of the hooks 40, 42 to their operative positions, their shanks 44 cross over each other and intersect at a point forwardly of the links 60, 62, as shown in Figure 4, so that the shanks 44 can engage each other in a mutually supporting relation which resists distortion thereof by the struggles of a fish gripped by the hooks 40, 42. It is also to be observed, that the barbed bends of the hooks 40, 42 enter the fish F at points spaced well behind the trailing hook assembly 74. On disengaging the hooks 40, 42 and the multiple trailing hook 80 from the fish F, the hooks 40, 42 are manually swung forwardly and laterally inwardly into their enclosed and concealed positions within the body 10, in which positions they are releasably held by the over-center holding action provided by the link and lever assembly 58.

It will also be seen that, with the hooks 40, 42 enclosed in the body 10, the device enables casting and trolling as with an ordinary spoon, because of the spoon-like form of the body 10 and the enclosing of the hooks 40, 42 therein. This enclosing of the fish-gripping hooks also eliminates snagging of these hooks, both in underwater material or in the material of the fisherman's clothes or body. The holding action provided by the link and lever assembly 58 being sufficient to preclude unwanted emergency of the hooks 40, 42 from the body 10 in casting and trolling operations.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks are nested within and extend longitudinally of the body and are parallel spaced crosswise of the body with said bends overlapping and positioned at the forward end of the body and with said rear ends at the rear end of the body, and pivot means pivoting the rear ends of the shanks on the body at the rear end thereof, and means connecting said shanks together for movement from the inoperative nested position to an operative position in which the shanks project outwardly of said body in criss-cross relation with the barbed bends spaced from and facing toward each other.

2. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks are nested within and extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, a trailing hook assembly pivotally connected to said shanks intermediate the ends thereof, and means including said assembly connecting said shanks together for movement from the inoperative nested position to an operative position in which the shanks project outwardly of said body in criss-cross relation with the barbed bends spaced from and facing toward each other and the trailing hook assembly between said shanks.

3. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, operating means for said hooks comprising links having pivotally connected laterally inward ends and laterally outward ends pivotally connected to said shanks at points spaced forwardly from said pivot means, the portions of the shanks between said pivot means and the connections of the links to the shanks being levers, and a trailing hook assembly having a shank having a multiple hook on its rear end and a pivotal connection on its forward end with the pivotal connection of the inward ends of the links, said body comprising overlying and coextensive top, intermediate, and bottom plates, means fixing the plates together at their forward ends, the portions of the plates behind said fixing means being spaced from each other, one of said fish-gripping hooks being located between the intermediate plate and the top plate and the other being located between the intermediate plate and the bottom plate.

4. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends said hooks having inoperative positions in which their shanks extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, operating means for said hooks comprising links having pivotally connected laterally inward ends and laterally outward ends pivotally connected to said shanks at points spaced forwardly from said pivot means, the portions of the shanks between said pivot means and the connections of the links to the shank being levers, and a trailing hook assembly having a shank having a multiple hook on its rear end and a pivotal connection on its forward end with the pivotal connection of the inward ends of the links, said body comprising overlying and coextensive top, intermediate, and bottom plates, means fixing the plates together at their forward ends, the portions of the plates behind said fixing means being spaced from each other, one of said fish-gripping hooks being located between the intermediate plate and the top plate and the other being located between the intermediate plate and the bottom plate, with related links similarly located between the intermediate plate and the top and bottom plates.

5. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, operating means for said hooks comprising links having pivotally connected laterally inward ends and laterally outward ends pivotally connected to said shanks at points spaced forwardly from said pivot means, the portions of the shanks between said pivot means and the connections of the links to the shanks being levers, and a trailing hook assembly having a shank having a multiple hook on its rear end and a pivotal connection on its forward end with the pivotal connection of the inward ends of the links, said body comprising overlying and coextensive top, intermediate, and bottom plates, means fixing the plates together at their forward ends, the portions of the plates behind said fixing means being spaced from each other, one of said fish-gripping hooks being located between the intermediate plate and the top plate and the other being located between the intermediate plate and the bottom plate, said plates having forward end portions which are deflected to one side of the planes of the remainder of the plates.

6. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, operating means for said hooks comprising links having pivotally connected laterally inward ends and laterally outward ends pivotally connected to said shanks at points spaced forwardly from said pivot means, the portions of the shanks between said pivot means and the connections of the links to the shanks being levers, and a trailing hook assembly having a shank having a multiple hook on its rear end and a pivotal connection on its forward end with the pivotal connection of the inward ends of the links, said body comprising overlying and coextensive top, intermediate, and bottom plates, means fixing the plates together at their forward ends, the portions of the plates behind said fixing means being spaced from each other, one of said fish-gripping hooks being located between the intermediate plate and the top plate and the other being located between the intermediate plate and the bottom plate, said plates having flat substantially parallel rear portions and forward end portions which are angled forwardly and downwardly relative to said rear portions.

7. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, operating means for said hooks comprising links having pivotally connected laterally inward ends and laterally outward ends pivotally connected to said shanks at points spaced forwardly from said pivot means, the portions of the shanks between said pivot means and the connections of the links to the shanks being levers, and a trailing hook assembly having a shank having a multiple hook on its rear end and a pivotal connection on its forward end with the pivotal connection of the inward ends of the links, said body comprising overlying and coextensive top, intermediate, and bottom plates, means fixing the plates together at their forward ends, the portions of the plates behind said fixing means being spaced from each other, one of said fish-gripping hooks being located between the intermediate plate and the top plate and the other being located between the intermediate plate and the bottom plate, said plates having flat substantially parallel rear portions and forward end portions which are angled forwardly and downwardly relative to said rear portions, said line attaching means being an eye located on the upper side of the forward end portion of the top body plate.

8. A fishing spoon comprising an elongated spoon body having forward and rear ends, fishing line attaching means on said body at the forward end thereof, a pair of fish-gripping hooks having shanks terminating in rear ends and in forward ends having laterally inwardly directed barbed bends, said hooks having inoperative positions in which their shanks extend longitudinally of the body and are parallel spaced crosswise of the body with said bends overlapping and positioned at the forward end of the body and with said rear ends at the rear end of the body, pivot means pivoting the rear ends of the shanks on the body at the rear end thereof, operating means for said hooks comprising links having pivotally connected laterally inward ends and laterally outward ends pivotally connected to said shanks at points spaced forwardly from said pivot means, the portions of the shanks between said pivot means and the connections of the links to the shanks being levers, and a trailing hook assembly having a shank having a multiple hook on its rear end and a pivotal connection on its forward end with the pivotal connection of the inward ends of the links, said body comprising overlying and coextensive top, intermediate, and bottom plates, means fixing the plates together at their forward ends, the portions of the plates behind said fixing means being spaced from each other, one of said fish-gripping hooks being located between the intermediate plate and the top plate and the other being located between the intermediate plate and the bottom plate.

References Cited in the file of this patent

UNITED STATES PATENTS

| 834,307 | Landon | Oct. 30, 1906 |
| 1,242,469 | Penrod | Oct. 9, 1917 |
| 1,638,923 | Danielson | Aug. 16, 1927 |
| 2,189,496 | Maurer | Feb. 6, 1940 |

FOREIGN PATENTS

| 1,135 | Great Britain | May 5, 1859 |